United States Patent [19]

Inubushi et al.

[11] 4,069,660
[45] Jan. 24, 1978

[54] CHEMICAL REACTION FURNACE SYSTEM

[75] Inventors: Masanobu Inubushi; Yoshiaki Toyoda, both of Kobe, Japan

[73] Assignee: Kawasaki Jukogyo Kabushiki Kaisha, Kobe, Japan

[21] Appl. No.: 711,504

[22] Filed: Aug. 3, 1976

[30] Foreign Application Priority Data

Aug. 8, 1975 Japan .................................. 50-96970

[51] Int. Cl.$^2$ ........................... F02C 9/02; F02G 3/00
[52] U.S. Cl. ................................ 60/39.25; 60/39.01; 60/39.02; 60/39.03
[58] Field of Search ................. 60/39.25, 39.01, 39.03, 60/39.2, 39.21, 660, 39.02

[56] References Cited

U.S. PATENT DOCUMENTS

| 3,704,587 | 12/1972 | Krieb | 60/39.25 |
|---|---|---|---|
| 3,747,335 | 7/1973 | Strub | 60/39.03 |
| 3,777,486 | 12/1973 | Damratowski | 60/39.25 X |
| 3,990,230 | 11/1976 | Kuwashima | 60/39.03 |

FOREIGN PATENT DOCUMENTS

| 18,321 | 5/1972 | Japan | 60/39.25 |
|---|---|---|---|
| 391,180 | 12/1973 | U.S.S.R. | 60/39.25 |

*Primary Examiner*—Clarence R. Gordon
*Attorney, Agent, or Firm*—Haseltine, Lake & Waters

[57] ABSTRACT

A chemical reaction furnace system having a reaction furnace, a reaction gas exhaust flowpath, and a gas scrubbing device in the exhaust flowpath and having a capability of controlling the furnace top pressure is characterized by the provision of a turbine in the exhaust flowpath downstream from the scrubbing device and being operable to recover energy in the reaction gas, a gas bypass flowpath branched from the exhaust flowpath at a point thereof between the scrubbing device and the turbine and bypassing the turbine, turbine inlet pressure controlling means, and a septum bypass valve installed in the bypass flowpath and operating in response to control by the turbine inlet pressure controlling means to control the turbine inlet gas pressure.

6 Claims, 1 Drawing Figure

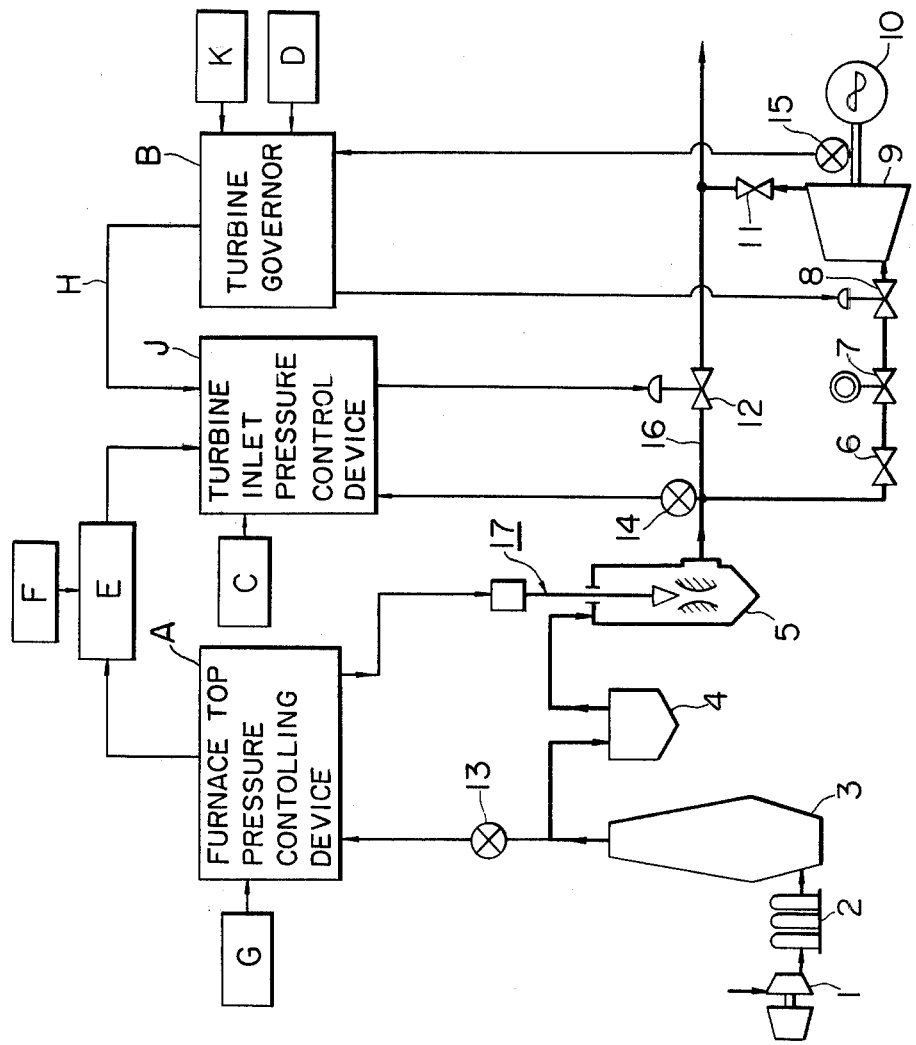

CHEMICAL REACTION FURNACE SYSTEM

BACKGROUND OF THE INVENTION

This invention relates generally to chemical reaction furnace systems and more particularly to a chemical reaction furnace system having a reaction furnace and a reaction gas scrubbing device possessing the capability of controlling the furnace top pressure of the reaction furnace.

SUMMARY OF THE INVENTION

It is an object of this invention to provide a chemical reaction furnace system of the above stated character in which, as control of the furnace top pressure is carried out by means of the reaction gas scrubbing device, a turbine-generator installed downstream therefrom is driven by the reaction gas discharged from the scrubbing device thereby to utilize effectively the energy possessed by the reaction gas.

Another object of the invention is to provide a chemical reaction furnace system as stated above in which, as the scrubbing effect of the reaction gas scrubbing device is maintained positively and regularly, the maximum gas pressure attainable at the turbine inlet is realized, and increase in the turbine heat drop is achieved thereby to obtain the maximum efficiency attainable in energy recovery.

Still another object of the invention is to provide, in a chemical reaction furnace system of the above stated character and functional capability, a septum bypass valve thereby not only to accomplish changeover and regulation of the gas flow rate at the time of starting and stopping the turbine but also to assure protection of the reaction furnace and turbine generator when the system assumes an abnormal operational state.

According to this invention, briefly summarized, there is provided a chemical reaction furnace system having a reaction furnace, a reaction gas main flowpath for conducting reaction gas away from the furnace top of the furnace, a reaction gas scrubbing device installed in said main flowpath, furnace top pressure controlling means associated with said scrubbing device, an expansion turbine provided in the gas main flowpath downstream from the scrubbing device and being operable to utilize energy in the reaction gas, a gas bypass flowpath branched from the main flowpath at a point between the scrubbing device and the turbine, a septum bypass valve installed in the bypass flowpath, and turbine inlet pressure controlling means operating said septum bypass valve to control the turbine inlet gas pressure.

The nature, principles, utility, and further feature of this invention will be apparent from the following detailed description with respect to a preferred embodiment of the invention when read in conjunction with the accompanying drawing.

In the following disclosure of the organization and operation of the chemical reaction furnace system according to this invention, a system relating to the operation of a blast furnace is selected as being the most generally represensitive example thereof. It should be understood, however, that the system of this invention is not limited to blast furnace operation system.

BRIEF DESCRIPTION OF THE DRAWING

In the drawing, the single FIGURE is a schematic flow diagram showing the essential organization of a blast furnace system taken as an example of the chemical reaction furnace system according to the invention.

DETAILED DESCRIPTION OF THE INVENTION

Referring to the drawing, the blast furnace system illustrated therein has a blast furnace 3 supplied with a hot air blast by an air blower 1 and a hot-air furnace 2. The furnace exhaust gas is discharged from the top of the blast furnace 3 and, after being passed successively through a dust collector 4 and a gas scrubbing device 5 capable of controlling the furnace top pressure, is fed by way of a turbine inlet valve 6, a main shut-off valve 7, and a speed-regulating valve 8 to a turbine 9 driven by this furnace gas.

The flow rate of the reaction gas through the gas scrubbing device 5 is controlled by control means 17, which is operable in response to a control signal from a furnace top pressure controlling device A of a control described hereinafter. The furnace top pressure of the furnace 3 varies inversely with this gas flowrate and, therefore, can be controlled by the controlling device A through the control means 17 of the scrubbing device 5.

The turbine 9 is coupled directly to and drives a generator 10. An outlet stop valve 11 is provided in the turbine exhaust gas line. A bypass gas flow line 16 having a septum bypass valve 12 therein is connected at one end to the turbine inlet at a point upstream from the turbine inlet valve 6 and at the other end to the turbine exhaust gas line at a point downstream from the outlet stop valve 11.

The above described gas-flow system is provided with a furnace top pressure detector 13 installed at the furnace gas outlet at the top of the blast furnace 3, a turbine, inlet pressure detector 14 installed at the inlet of the turbine 9 at a point in the gas flow line upstream from the turbine inlet valve 6, and a turbine rotational speed (tachometric) detector 15 installed at a suitable point to detect the speed of the turbine or generator shaft.

The furnace top pressure detector 13 and has a furnace top pressure controlling device A receives detection signals from the furnace top pressure setter G for carrying out setting with respect to the controlling device A. Operatively associated with the furnace top pressure controlling deive A, there is provided a control system for operating cooperatively with the above-mentioned detectors 14 and 15 to control the operation of the turbine system. This control system comprises, essentially: a turbine governor B receiving detection signals from the turbine speed detector 15; a turbine inlet pressure control device J receiving detection signals from the turbine inlet pressure detector 14; a turbine inlet pressure setter C for carrying out setting with respect to the turbine inlet pressure control device J; a load limit setter D for carrying out setting with respect to the turbine governor B; a turbine inlet pressure set value upper limiter E for carrying out limiting operation with respect to the device J; a minimum differential pressure setter F for carrying out setting with respect to the limiter E from the furnace top pressure controlling device A; a load setter K for carrying setting with respect to the turbine governor B; and a feed-forward signal circuit H connected between the turbine governor B and the turbine inlet pressure controlling device J.

The septum valve 12 operates in response to control by the turbine inlet pressure control device J, which operates in response to detection signals from the turbine inlet pressure detector 14 and the feed-forward signal circuit H and in accordance with set values determined by the turbine inlet pressure setter C and the turbine inlet pressure set value upper limiter E.

The turbine governor B which is provided separately from the turbine inlet pressure control device J and which includes a load control circuit (not shown), controllably operates the speed-regulating valve 8 in response to detection signals from the turbine rotational speed (tachometric) detector 15 and in accordance with values set by the load setter K and the load limiter setter D.

In the blast-furnace system of the above described general organization, the turbine 9 is operated only when the blast furnace 3 has assumed a stable high-pressure operational state. Accordingly, at the time of start-up of the blast-furnace operation and at the time when there is no air flow, the turbine 9 is stopped, and the main shut-off valve 7 and the speed regulating valve 8 are in their fully-closed state, whereby all of the blast furnace generated gas flows through the bypass line 16 and the septum valve 12 in fully-opened state. The furnace top pressure at this time is being controlled at a constant value by the furnace top pressure controlling function of the gas scrubbing device 5.

As a general rule, the turbine-generator is operated by parallel loading with an outside power supply. During the operation of the turbine 9, and the turbine inlet pressure is automatically held constant by the septum valve 12, and the great portion of the gas generated in the blast furnace 3 is caused to flow through the turbine 9 thereby to effectively recover the energy possessed by the gas. At this time, the turbine inlet pressure is maintained at the highest possible value at which the scrubbing performance of the gas scrubbing device 5 can be maintained thereby to increase the heat drop in the turbine and to increase the recovered energy. Furthermore, the furnace top pressure at this time is controlled at a constant value by the gas scrubbing device 5, and the turbine rotational speed is synchronized with that of the outside power supply and maintained substantially constant.

The various modes of operation of the turbine applied to this example of the system of this invention are as follows.

2-1. Normal Operation

2-1-1. Starting the Turbine

It will be first assumed that the septum valve 12 is fully open, that the turbine 9 is stopped, and that the entire quantity of the generated gas from the blast furnace is not passing through the turbine 9 but is flowing through the septum valve 12. The furnace top pressure in this case is being controlled by the control means 17 of the gas scrubbing device 5.

When a command for starting the turbine is issued, the turbine inlet valve 6 and the outlet stop valve 11 are opened, and gas is passed through the turbine as a preparatory turbine starting step. The turbine starting procedure is then carried out in sequence in the following manner.

First, the main shut-off valve 7 is opened, and then, by operating the turbine inlet pressure setter C, the set value of the turbine inlet pressure is gradually increased until its upper limit is reached, whereupon the septum valve 12 automatically closes gradually, and the turbine inlet pressure is held at the pressure set by the turbine inlet pressure set value upper limiter E. As a consequence, the turbine inlet pressure never exceeds the pressure value which is obtained when the set differential pressure, due to the minimum differential pressure setter F, between the inlet and outlet sides of the gas scrubber 5 is substracted from the set value of the furnace top pressure due to the furnace top pressure setter G. As a result, the scrubbing operation of the gas scrubber 5 is continually maintained in its normal state.

At this time, the speed-regulating valve 8 is gradually opened by changing the setting of the load limiter D through the turbine governor B, whereupon the turbine 9 is gradually accelerated until its speed eventually reaches the minimum set speed control of the turbine governor B, and the turbine 9 thereupon is placed under rotational speed control.

At this point, the synchronizing of the turbine 9 with the outside power supply is carried out automatically or manually. When synchronization has been attained, the aforementioned load control circuit of the turbine governor B, which has been inoperative up to this time, automatically becomes operative, and the operation of the turbine is placed under load control.

2-1-2. Load Application

The set value of the load is increased by means of the load setter K through the turbine governor B, whereupon the speed-regulating valve 8 opens, and the turbine load increases. At the same time, the septum valve 12 automatically reaches its fully closed state to maintain the turbine inlet pressure constant, and the entire flow quantity of the blast furnace generated gas flows through the turbine 9.

2-1-3. Stopping the Turbine

In response to a command for stopping the turbine, the speed-regulating valve 8 is closed by means of the load setter K through the turbine governor B, whereupon the turbine load begins to decrease, and, at the same time, the septum valve 12 begins to open. When the turbine load becomes zero, the generator 10 automatically becomes disconnected from the outside power supply, and the control of the turbine operation is changed over from load control to speed control.

The speed-regulating valve 8 is further closed to full closure by means of the load limit setter D through the turbine governor B, whereupon the turbine 9 stops. Then, by means of the turbine inlet pressure setter C, the turbine inlet pressure set value is lowered toward the lower limit, whereupon the septum valve 12 gradually opens until it is fully opened. At this time, the blast furnace generated gas does not pass through the turbine 9, and its total flow quantity flows through the septum valve 12.

2-2. Abnormal Operation

2-2-1. Turbine Tripping and Load Cut-off

In this case, the generator 10 is disconnected from the outside power supply, and the main shut-off valve 7 and/or the speed-regulating valve 8 rapidly closed thereby to protect the turbine 9 and the generator 10. At this time, the turbine inlet pressure rises rapidly, and, in concert with this rise, the furnace top pressure also rises. As a measure for preventing excessive pressure rise, a feed-forward compensation circuit H is provided for opening the septum valve 12 in response to a turbine tripping or load shut-off signal.

2-2-2. Blast Furnace Blow-by

In the event of an occurrence such as a blow-by of the blast furnace 3 during the operation of the turbine 9 with the result that a large quantity of the blast furnace gas flows instantaneously into the turbine, the furnace top will rise as a natural consequence. If the furnace top pressure becomes excessively high, a bleeder valve installed at the blast furnace will blow, but this can be prevented and overcome by installing in combination an abnormal bypass valve operating device adapted to open the septum valve 12 upon detection of excessively high furnace top pressure.

Thus, in the chemical reaction furnace system according to this invention of the organization and operation as described above, the reaction gas discharged from the gas scrubbing device 5 is utilized to drive a turbine-generator installed downstream therefrom while furnace top pressure control is carried out by the gas scrubbing device, whereby the energy possessed by the reaction gas can be effectively utilized.

Furthermore, the maximum attainable gas pressure of the turbine inlet is realized as the scrubbing effectiveness of the reaction gas scrubbing device is maintained in a positive, steady-state manner, and the turbine heat drop is increased, whereby it is possible to achieve maximum possible efficiency of energy recovery. In addition, as a result of the installation of the septum bypass valve, there are afforded not only the possibility of changing over and adjusting of the gas flow rate at the time of starting and stopping the turbine but also many other unique features such as positive protection of the reaction furnace and the turbine-generator combination when the system is in an abnormal operational state.

While it is obvious that, when applied to a blast furnace system of an iron and steel manufacturing plant, the chemical reaction furnace system according to this invention as described above exhibits remarkable effectiveness, it will also be apparent that this system is similarly highly effective when applied to other general systems such as a chemical plant system comprising in combination a chemical reaction vessel which discharges high-pressure gas containing dust and an expansion turbine driven by the high-pressure gas.

We claim:

1. A chemical reaction furnace apparatus employing a reaction furnace, a reaction gas main flowpath for conducting reaction gas away from the top of the reaction furnace, and a reaction gas scrubbing device (5) installed in said main flowpath and having a function of controlling the pressure of the reaction gas in the top of the reaction furnace, said apparatus comprising an expansion turbine provided in the gas main flowpath downstream from said scrubbing device and being operable to utilize energy in the reaction gas, a gas bypass flowpath branched from said main flowpath at a point thereof between said scrubbing device and said turbine and bypassing the turbine, a bypass valve installed in said bypass flowpath, a turbine inlet pressure detector for detecting inlet gas pressure of the turbine, turbine inlet pressure control means receiving a signal from said pressure detector to control said bypass valve thereby to maintain the inlet gas pressure of the turbine at the highest possible value at which the scrubbing performance of said scrubbing device can be maintained, a turbine speed regulating valve installed in said main flowpath between said pressure detector and said turbine, a speed detector for detecting the rotational speed of the turbine, and a turbine governor receiving signal from said speed detector to control said speed regulating valve.

2. An apparatus as claimed in claim 1, including: a turbine inlet pressure set value upper limiter receiving furnace top pressure signal from a furnace top pressure controlling device and associated with said turbine inlet pressure control means to suppress the turbine inlet gas pressure to be set in said control means to a value which results from subtracting a set differential pressure between the inlet and outlet of said gas scrubbing device from furnace top pressure set in the furnace top pressure controlling device.

3. An apparatus as claimed in claim 1, wherein: said turbine inlet pressure set value upper limit has associated therewith a minimum differential pressure setter for carrying out setting with respect to the limiter.

4. An apparatus as claimed in claim 1, including: a turbine inlet pressure setter in association with said turbine inlet pressure control means.

5. An apparatus as claimed in claim 1, including: a turbine load limit setter and a turbine load setter, each of said setters being associated with said turbine governor to control said turbine speed regulating valve.

6. An apparatus as claimed in claim 1, including: feed-forward compensation means connecting said turbine governor to said turbine inlet pressure controlling means and being operative through the turbine inlet pressure controlling means to open said bypass valve upon detecting a turbine tripping or load shut-off.

* * * * *